United States Patent
Shaharabany et al.

(10) Patent No.: US 10,635,352 B2
(45) Date of Patent: Apr. 28, 2020

(54) DISTRIBUTED FLASH INTERFACE MODULE PROCESSING

(71) Applicant: Western Digital Technologies, Inc., San Jose, CA (US)

(72) Inventors: Amir Shaharabany, Kochav Yair (IL); Yoav Markus, Tel Aviv (IL); Opher Lieber, Hadera (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 27 days.

(21) Appl. No.: 15/976,456

(22) Filed: May 10, 2018

(65) Prior Publication Data
US 2019/0347041 A1  Nov. 14, 2019

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC ...... G06F 3/067; G06F 3/0659; G06F 3/0689; G06F 3/0683
USPC .......................................................... 710/36
See application file for complete search history.

(56) References Cited

U.S. PATENT DOCUMENTS

| | | | |
|---|---|---|---|
| 9,390,033 B2* | 7/2016 | Lin ........................ | G06F 3/0679 |
| 9,459,881 B2* | 10/2016 | Tuers .................... | G06F 9/4401 |
| 9,875,053 B2* | 1/2018 | Frid ...................... | G06F 3/0634 |
| 10,110,673 B2* | 10/2018 | Coskun ................ | G06F 9/4451 |
| 10,289,327 B2* | 5/2019 | Zevulun ................ | G06F 3/0604 |
| 2014/0189201 A1* | 7/2014 | Dhakshinamurthy ...................... | G06F 13/1684 711/103 |
| 2014/0223073 A1* | 8/2014 | Benisty ............... | G06F 12/0246 711/103 |
| 2016/0103732 A1* | 4/2016 | Tuers .................. | G06F 11/1048 714/764 |
| 2016/0357474 A1* | 12/2016 | Frid ....................... | G06F 3/0634 |

* cited by examiner

*Primary Examiner* — Brian T Misiura
(74) *Attorney, Agent, or Firm* — Loza & Loza, LLP; Gabriel Fitch

(57) ABSTRACT

Aspects of the disclosure provide for distributed flash interface module (FIM) processing in a solid state drive (SSD). Methods and apparatus lock a queue and retrieve a command from the queue. The command indicates an operation to be executed in conjunction with one or more non-volatile (NVM) dies of the SSD. The methods and apparatus then lock a NVM interface corresponding to the one or more NVM dies, determine whether the operation is a transfer operation, and execute the operation using the locked NVM interface according to whether the operation is the transfer operation. When the operation is determined to be the transfer operation, the queue is unlocked to allow execution of a second operation from the queue by a second controller in parallel with the operation executed by the controller. Thereafter, the NVM interface is unlocked after execution of the operation is complete.

23 Claims, 6 Drawing Sheets

DISTRIBUTED FLASH INTERFACE MODULE PROCESSING

FIELD

The present disclosure relates generally to solid state drives (SSDs) including non-volatile memories (NVMs), and more specifically, to methods and apparatus for performing NVM operations of different flash interface modules (FIMs) in a distributed manner.

INTRODUCTION

In a variety of consumer electronics, solid state drives (SSDs) incorporating non-volatile memories (NVMs) are frequently replacing or supplementing conventional rotating hard disk drives for mass storage. These non-volatile memories may include one or more flash memory devices, such as NAND flash memories, and the flash memory devices may be logically divided into blocks with each of the blocks further divided into logically addressable pages. These logical pages may be any of a variety of sizes (e.g., 512 Bytes, 1 Kilobytes, 2 Kilobytes, 4 Kilobytes).

A previous architecture allows flash operations to be split between flash interfaces of different flash interface modules (FIMs). This poses a challenge to synchronization between the flash interfaces as each FIM with its own FIM queue is operated in an independent manner. If power management requirements demand that flash dies perform operations according to a certain order, then an order of operations is to be preserved. However, if the dies are in different FIMs, the architecture becomes complex when preserving the order of operations amongst the different FIMs. In previous solutions, the enforcement of ordering is performed at a host/CPU level. However, enforcing such order at the CPU level reduces performance and further causes more consumption of resources. Accordingly, it would be beneficial to be able to allow certain operations of different FIMs to be executed in a serialized manner at a FIM level that decreases system complexity when preserving an order of operations amongst the different FIMs and utilizes resources (e.g., RAM) more efficiently. It would further be beneficial to be able to allow other operations of different FIMs to be executed in a parallel manner that increases performance capacity.

SUMMARY

According to an aspect of the present disclosure, a method of performing an operation related to one or more non-volatile memory (NVM) dies of a solid state drive (SSD) is disclosed. The method includes locking a queue and retrieving a command from the queue. The command indicates an operation to be executed in conjunction with one or more NVM dies. The method further includes locking a NVM interface corresponding to the one or more NVM dies, determining whether the operation is a transfer operation, executing the operation using the locked NVM interface according to whether the operation is the transfer operation, and unlocking the NVM interface after execution of the operation is complete.

According to another aspect, a solid state drive (SSD) is disclosed, which includes one or more non-volatile memory (NVM) dies, a queue, a NVM interface corresponding to the one or more NVM dies, and a controller communicatively coupled to a host device, the one or more NVM dies, the queue, and the NVM interface. The controller is configured to lock the queue and retrieve a command from the queue. The command indicates an operation to be executed in conjunction with the one or more NVM dies. The controller is further configured to lock the NVM interface corresponding to the one or more NVM dies, determine whether the operation is a transfer operation, execute the operation using the locked NVM interface according to whether the operation is the transfer operation, and unlock the NVM interface after execution of the operation is complete.

According to yet another aspect, a non-volatile memory (NVM) device including an apparatus for performing an operation related to one or more non-volatile memory (NVM) dies of a solid state drive (SSD) is disclosed. The apparatus includes means for locking a queue and means for retrieving a command from the queue. The command indicates an operation to be executed in conjunction with one or more NVM dies. The apparatus further includes means for locking a NVM interface corresponding to the one or more NVM dies, means for determining whether the operation is a transfer operation, means for executing the operation using the locked NVM interface according to whether the operation is the transfer operation, and means for unlocking the NVM interface after execution of the operation is complete.

According to an aspect of the present disclosure, a method of performing an operation related to one or more non-volatile memory (NVM) dies of a solid state drive (SSD) is disclosed. The method includes retrieving a first operation from a queue to be executed in conjunction with one or more NVM dies, determining whether the first operation is a transfer operation, and executing the first operation in either a parallel manner or a serial manner with a second operation from the queue to be executed by a second controller according to whether the first operation is the transfer operation.

According to another aspect, a solid state drive (SSD) is disclosed, which includes one or more non-volatile memory (NVM) dies, a queue, a NVM interface corresponding to the one or more NVM dies, and a controller communicatively coupled to a host device, the one or more NVM dies, the queue, and the NVM interface. The controller is configured to retrieve a first operation from the queue to be executed in conjunction with one or more NVM dies, determine whether the first operation is a transfer operation, and execute the first operation in either a parallel manner or a serial manner with a second operation from the queue to be executed by a second controller according to whether the first operation is the transfer operation.

According to yet another aspect, a non-volatile memory (NVM) device including an apparatus for performing an operation related to one or more non-volatile memory (NVM) dies of a solid state drive (SSD) is disclosed. The apparatus includes means for retrieving a first operation from a queue to be executed in conjunction with one or more NVM dies, means for determining whether the first operation is a transfer operation, and means for executing the first operation in either a parallel manner or a serial manner with a second operation from the queue to be executed by a second controller according to whether the first operation is the transfer operation.

DETAILED DESCRIPTION

The present disclosure provides methods and apparatus for distributed flash interface module (FIM) processing in a solid state drive (SSD). In more detail, a controller performs an operation related to one or more non-volatile memory (NVM) dies of the SSD by locking a queue and retrieving an operation command from the queue. The operation command indicates an operation to be executed with respect to the one or more NVM dies. The controller then locks a NVM interface associated with the one or more NVM dies, determines whether the operation is a transfer operation, and executes the operation using the locked NVM interface according to whether the operation is the transfer operation. When the operation is determined to be the transfer operation, the controller unlocks the queue to allow a second transfer operation from the queue to be executed by a second controller in parallel with the operation executed by the controller. When the operation is determined to not be the transfer operation, the controller executes the operation in a serial manner with respect to a second operation from the queue to be executed by the second controller. Thereafter, the controller unlocks the NVM interface after execution of the operation is complete.

Before discussing the present methods and apparatus, it is noted that previous architectures where flash operations are split between flash interfaces of different flash interface modules (FIMs) pose a challenge to synchronization between the flash interfaces. Each FIM with its own FIM queue is operated in an independent manner. If power management requirements demand that flash dies perform according to a certain order, then an order of operations must be preserved. For example, the power management requirements may demand that only a certain amount of dies work simultaneously, such that one die associated with a specific FIM may only start operating when another die associated with another FIM completes an operation. However, if the dies are in different FIMs, the architecture becomes complex when preserving the order of operations amongst the different FIMs. In previous solutions, the enforcement of ordering is performed at a CPU level. However, enforcing such order at the CPU level reduces performance and further causes more consumption of resources.

In light of the known solutions, the presently disclosed methods and apparatus for distributed FIM processing are advantageous for allowing non-transfer operations of different FIMs to be executed in a serialized manner. This avoids deserialized operation that increases a complexity of a system when preserving an order of operations amongst different FIMs. Consequently, resources (e.g., RAM) are utilized more efficiently. Moreover, the presently disclosed methods and apparatus allow different FIMs to simultaneously perform transfer operations, which increases performance capacity.

Figure 1:
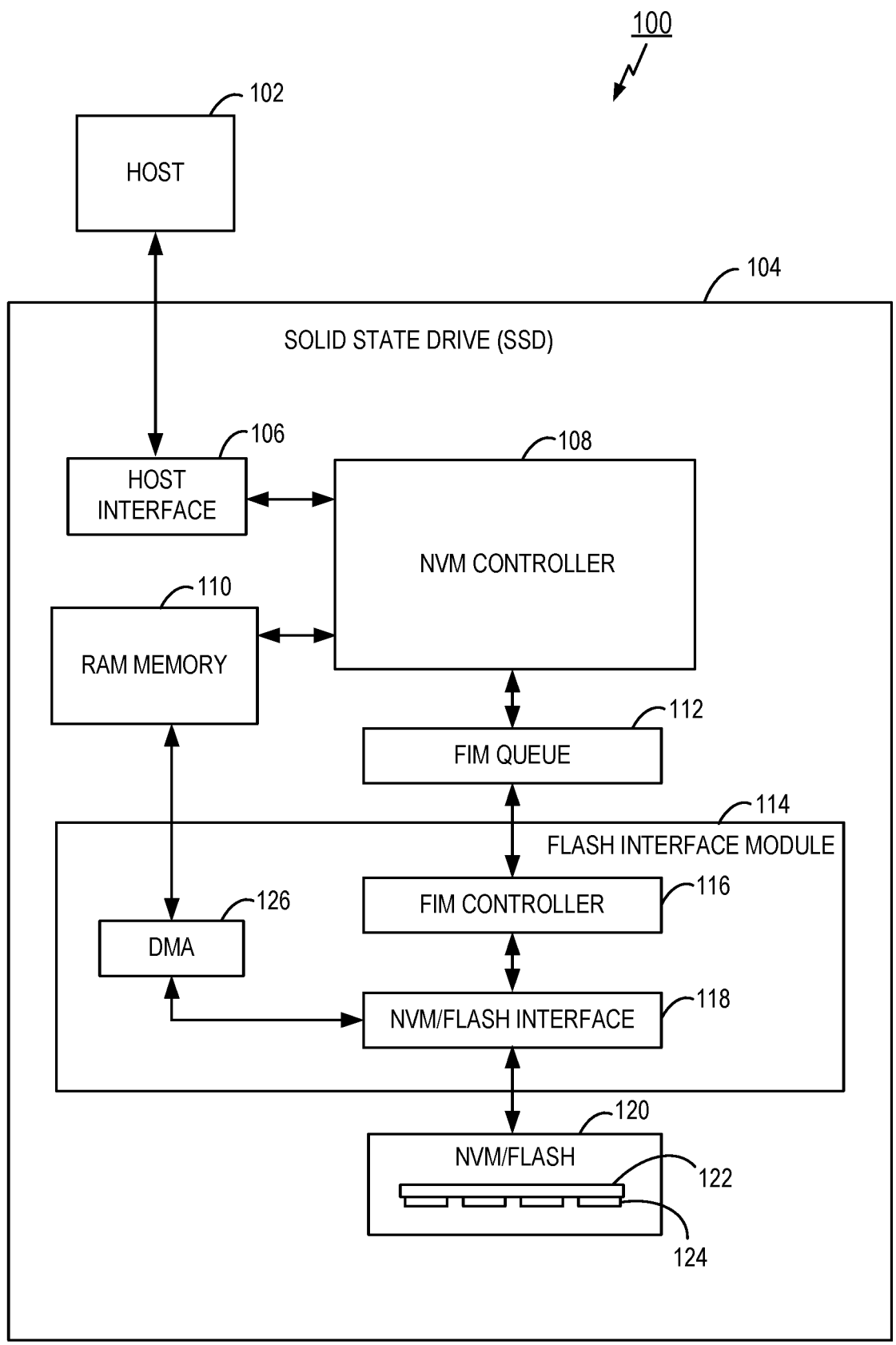
FIG. 1 is a block diagram of an exemplary solid state drive (SSD) in which distributed flash interface module (FIM) processing may be performed in accordance with aspects of the present disclosure.

Referring to the drawings, FIG. 1 is a block diagram of a system 100 including an exemplary solid state drive (SSD) in which the disclosed distributed flash interface module (FIM) processing may be implemented in accordance with aspects of the disclosure. The system 100 includes a host 102 and a SSD storage device 104 coupled to the host 102. The host 102 provides commands to the SSD storage device 104 for transferring data between the host 102 and the SSD storage device 104. For example, the host 102 may provide a write command to the SSD storage device 104 for writing data to the SSD storage device 104 or a read command to the SSD storage device 104 for reading data from the SSD storage device 104. The host 102 may be any system or device having a need for data storage or retrieval and a compatible interface for communicating with the SSD storage device 104. For example, the host 102 may a computing device, a personal computer, a portable computer, a workstation, a server, a personal digital assistant, a digital camera, or a digital phone as merely a few examples.

The SSD storage device 104 includes a host interface 106, a controller 108 (or alternatively, an NVM controller 108), a RAM memory 110, a flash interface module (FIM) queue 112, one or more flash interface modules (FIMs) 114, and a non-volatile memory (NVM) 120, such as a NAND flash memory, for example. The one or more FIMs 114 includes one or more FIM controllers 116 and one or more NVM/flash interfaces 118. In some aspects, the FIM queue 112 may be part of the one or more FIMs 114. The one or more FIMs 114 may also include a direct memory access (DMA) module 126 that allows a FIM to access the NVM 120 independently of the controller 108. The host interface 106 is coupled to the controller 108 and facilitates communication between the host 102 and the controller 108. The host interface 106 may also include a DMA module that allows the host interface 106 to access the NVM 120 independently of the controller 108. Additionally, the controller 108 is coupled to the RAM memory 110 and coupled to the NVM 120 via the one or more FIMs 114. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD storage device 104. In other embodiments, the SSD storage device 104 is remote with respect to the host 102 or is contained in a remote computing system communicatively coupled with the host 102. For example, the host 102 may communicate with the SSD storage device 104 through a wireless communication link.

The controller 108 controls operation of the SSD storage device 104. In various aspects, the controller 108 receives commands from the host 102 through the host interface 106 and performs the commands to transfer data between the host 102 and the NVM 120. Furthermore, the controller 108 may manage reading from and writing to memory 110 for performing the various functions effected by the controller and to maintain and manage cached information stored in memory 110.

The controller 108 may include any type of processing device, such as a microprocessor, a microcontroller, an embedded controller, a logic circuit, software, firmware, or the like, for controlling operation of the SSD storage device 104. In some aspects, some or all of the functions described herein as being performed by the controller 108 may instead be performed by another element of the SSD storage device 104. For example, the SSD storage device 104 may include a microprocessor, a microcontroller, an embedded controller, a logic circuit, software, firmware, or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements. In yet further aspects, some or all of the functions described herein as being performed by the controller 108 may instead be performed by the one or more FIMs 114 via the one or more FIM controllers 116.

The RAM memory 110 may be any memory, computing device, or system capable of storing data. For example, the memory 110 may be a random-access memory (RAM), a dynamic random-access memory (DRAM), a double data rate (DDR) DRAM, a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the controller 108 uses the memory 110, or a portion thereof, to store data during the transfer of data between the host 102 and the NVM 120. For example, the memory 110 or a portion of the memory 110 may be a cache memory.

The NVM 120 receives data from the controller 108 via the FIM queue 112 and the one or more FIMs 114 and stores the data. The NVM 120 may be any type of non-volatile memory, such as a flash storage system, a NAND-type flash memory, a solid state drive, a flash memory card, a secure digital (SD) card, a universal serial bus (USB) memory device, a CompactFlash card, a SmartMedia device, a flash storage array, or the like. The NVM 120 may include one or more memory modules 122, wherein one or more memory dies 124 are formed as part of a memory module 122.

The controller 108, the one or more FIMs 114, or the NVM 120 can be configured to perform any of the processes described herein for distributed flash interface module (FIM) processing in a solid state drive (SSD).

A previous flash storage device architecture generally includes a controller (e.g., controller 108) controlling a number of flash dies (e.g., within NVM 120). As a flash interface (FI) (e.g., NVM/flash interface 118) speed may be limited, more than one flash interface was provided on a SSD such that the flash dies are distributed amongst different flash interfaces. For example, a first set of flash dies may be associated with one flash interface while a second set of flash dies may be associated with another flash interface. Each flash interface may be operated by a respective flash interface module (FIM). Each FIM may include a FIM queue, a FIM CPU (e.g., FIM controller), a direct memory access (DMA) module, and the flash interface itself.

The previous architecture where flash operations are split between the flash interfaces of different FIMs poses a challenge to synchronization between the flash interfaces as each FIM with its own FIM queue is operated in an independent manner. If power management requirements demand that only a certain amount of dies work simultaneously, then one die associated with a specific FIM may only start operating when another die associated with another FIM completes an operation. This makes the architecture complex when preserving an order of operations between the different FIMs via RAM allocations and host transfer order restrictions. If an order restriction requires an order enforcement between operations, the enforcement must occur at a CPU level, which causes a performance impact. The performance impact is due to the previous architecture design providing more than one flash interface operated by a respective FIM, where each FIM has a corresponding input queue (FIM queue), thus causing the FIMs to be unsynchronized and further causing issues in the SSD.

An order restriction may require that the CPU perform an operation in a first die (associated with a first FIM and a first FIM queue) prior to performing an operation in a second die (associated with a second FIM and a second FIM queue). Notably, if the first FIM and the second FIM operate independently of each other, then the first FIM queue and the second FIM queue are not synchronized in any way. When the CPU sends operation commands to the different FIM queues, the order of operations may be lost (reordered) and a waste condition occurs. As such, the enforcement of ordering must be performed at the CPU level to maintain the order of operations. However, enforcing such order at the CPU level reduces performance. In the previous example, the CPU may not be able to initiate the operation in the second die (e.g., send the operation command to the second FIM queue) until the first die has completed its operation. Accordingly, the system may suffer from latency and loss of throughput.

In general, different dies may not be associated with the same FIM. Moreover, if the dies are not associated with the same FIM, the dies are not associated with the same FIM queue. As such, if operations exist that need to be synchronized between the dies, the enforcement of order between the operations must be performed at the CPU level since the dies are associated with different FIM queues that run independently of each other. However, enforcing the order at the CPU level reduces performance.

The previous architecture does not require FIMs to be dependent on each other. That is, each FIM works independently and unsynchronized with respect to other FIMs. However, such design causes more consumption of resources, such as RAM. For example, the previous architecture may require a buffer to contain all unsynchronized data or a synchronization mechanism between the FIMs. Moreover, in the previous architecture, power management is performed in a different power domain, which reduces power usage efficiency. Also, the previous architecture forces order restrictions to be handled at a higher level (e.g., CPU level, firmware, etc.) that impacts hardware utilizations and performance.

In an aspect of the disclosure, a flash storage device includes two interfaces. A first interface is a host interface (e.g., host interface 106) that is used to communicate with the host (e.g., host 102) regarding command handling and storage data transfer between an internal RAM (e.g., RAM 110) of the device and the host interface. The second interface is a flash interface (e.g., NVM/flash interface 118) that is used to transfer data to/from flash storage dies (e.g., dies of the NVM/flash 120) from/to the internal storage device RAM. The flash interface data transfer speed may be limited by a flash die architecture, which includes a bus shared by a number of flash dies. However, the host interface of a storage device application-specific integrated circuit (ASIC) may be capable of higher speed. Therefore, the host interface may have much higher throughput (e.g., 3 or 4 times the throughput) relative to a flash interface (or flash interface module (FIM)) throughput. Accordingly, two or more FIMs may be provided in the SSD to increase the performance (throughput) of the dies. By increasing/multiplying the number of FIMs in the SSD, and overall flash device throughput may be increased to match the host interface throughput.

In an aspect of the disclosure, distributed FIM processing (DFP) is disclosed in which a hardware module (e.g., FIM CPU or FIM) is able to have a mutually exclusive (mutex) lock on a single FIM queue. The FIM CPU's mutex lock on the single FIM queue allows a transfer operation of the FIM CPU to/from one or more flash dies via the single FIM queue to be performed in parallel with a transfer operation of another FIM CPU to/from one or more other flash dies via the single FIM queue. Performance of all other operations (non-transfer operations) of the FIM CPU and the other FIM CPU are maintained in a serial manner. Accordingly, the total throughput of the SSD is maximized as the design allows for simultaneous transfer operations. Moreover, issues related to unsynchronized FIM operations may be prevented as all non-transfer die operations may be serialized and no synchronization mechanisms are needed at the FIM level.

In an aspect of the disclosure, operations that only trigger a command at the die level, such as a die selection operation, a programming operation, a sense operation, a read die status operation, an erase operation, and/or a latch move operation (e.g., moving information from one buffer to another buffer), are serialized as they are all performed under a same hardware lock (e.g., flash interface lock). The time involved to launch such operations to the die is minor relative to a data transfer time. Moreover, serializing such operations/commands between the flash interfaces does not reduce the performance and utilization of a flash interface. In an aspect, when the FIM CPU launches an operation to a specific flash interface, the FIM CPU may release the flash interface lock prior to, or after execution of, the operation according to an operation flag indicated by firmware or command type.

In an aspect of the disclosure, a read operation and a write operation may include two parts: 1) a non-transfer operation, and 2) a transfer operation. During a read operation, a controller (e.g., FIM CPU) may first perform a sense operation (non-transfer operation) to detect that data is in a die or internal buffer (e.g., internal NAND buffer), and thereafter, transfer the data to an external buffer (e.g., host). During a write operation, the controller may first take data from the host and transfer the data to an internal buffer (e.g., internal NAND buffer). Thereafter, the controller may perform a programming operation (non-transfer operation) to indicate the existence of data in the internal buffer to be stored in a memory array.

Figure 2:
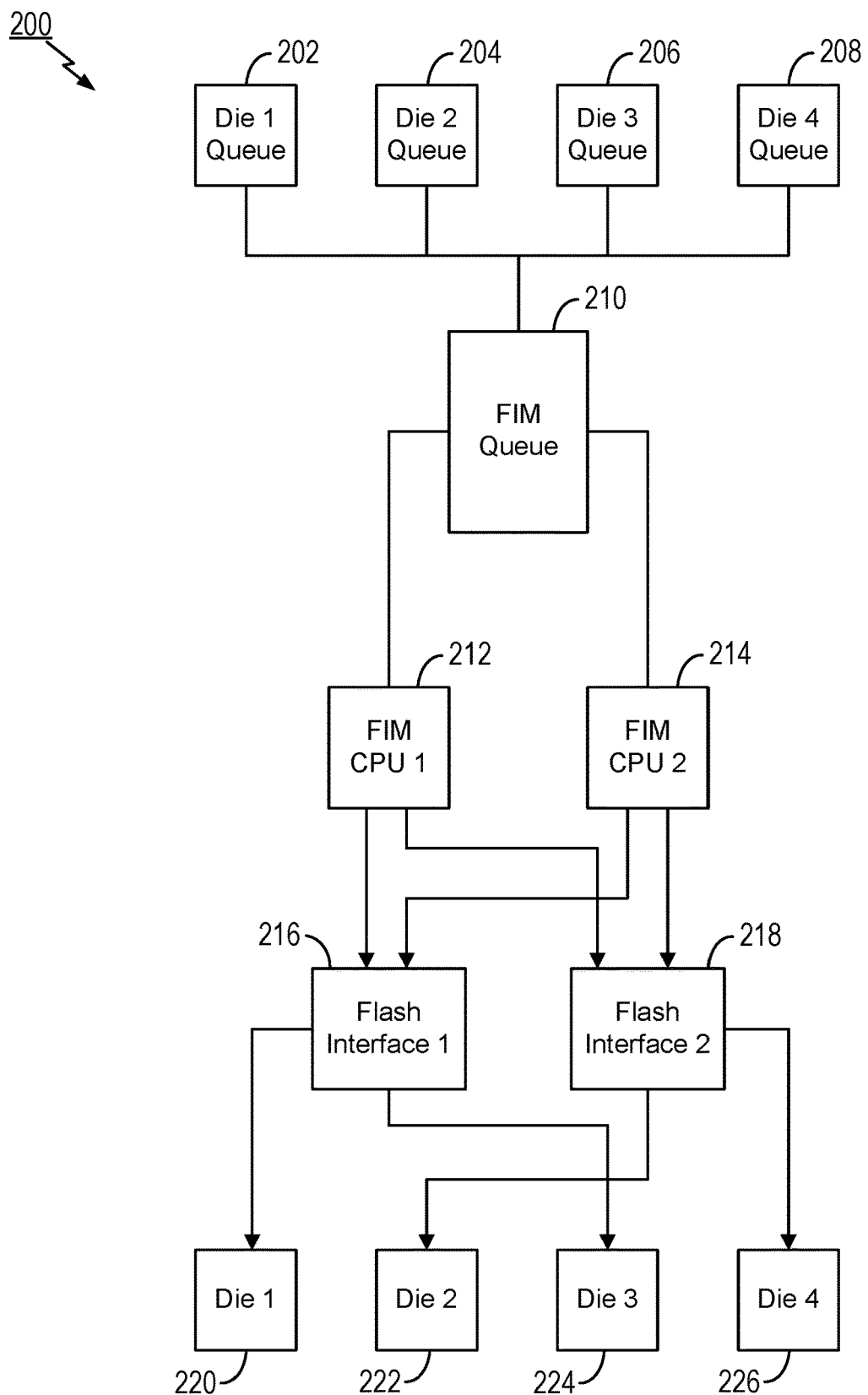
FIG. 2 illustrates an example system for distributed FIM processing in accordance with aspects of the present disclosure.

FIG. 2 illustrates an example system 200 for distributed flash interface module (FIM) processing in accordance with aspects of the present disclosure. The system 200 includes a number of die operation queues, such as die 1 queue 202, die 2 queue 204, die 3 queue 206, and die 4 queue 208, which may be part of a data path module, for example. The die operation queues feed operation commands into a single input queue, FIM queue 210. The FIM queue 210 holds the operation commands that a FIM will execute. The operation commands may include commands for non-transfer operations, such as a die selection operation, a programming operation, a sense operation, a read die status operation, an erase operation, and/or a move latch operation, as well as commands for transfer operations (e.g., transferring data to/from a flash die). In an aspect, the FIM queue 210 may be hardware locked to ensure mutual exclusive (mutex)/semaphore usage. When locked, the FIM queue 210 may only handle one operation at a time, except for transfer operations.

The system 200 further includes a number of FIM controllers, such as FIM CPU 1 212 and FIM CPU 2 214. The FIM CPUs execute the operation commands. For example, the FIM CPUs may translate the commands into die flash operation codes and apply the operation codes using flash interfaces, such as flash interface 1 (216) and flash interface 2 (218). A flash interface is an interface for a FIM CPU to communicate with a flash die. The flash interface may be connected to one or more dies. For example, the flash interface 1 (216) is connected to die 1 (220) and die 3 (224) while the flash interface 2 (218) is connected to die 2 (222) and die 4 (226). In an aspect, a flash interface may be hardware locked to ensure mutual exclusive (mutex)/semaphore usage. When the flash interface is locked by a FIM CPU, the flash interface may only handle operations associated with the locking FIM CPU. The flash interface lock helps avoid a race, and maintain serialized operations, between FIM CPUs over a specific flash interface.

In an aspect, the present disclosure provides for a single FIM queue (e.g., FIM queue 210) and two or more FIM CPUs (e.g., FIM CPU 1 (212) and FIM CPU 2 (214)) that process operation commands in the single FIM queue. A FIM CPU may receive operation commands related to two FIMs. Neither of the FIM CPU 1 (212) and the FIM CPU 2 (214) is attached to a specific hardware FIM. For example, as shown in FIG. 2, the FIM CPU 1 (212) is attached to both the flash interface 1 (216) of a first FIM and the flash interface 2 (218) of a second FIM. Similarly, the FIM CPU 2 (214) is attached to both the flash interface 1 (216) of the first FIM and the flash interface 2 (218) of the second FIM.

During a transfer operation, two or more FIM CPUs can work in parallel. For example, when one of the FIMs needs to perform a transfer operation (e.g. read operation), one of the FIM CPUs (e.g., FIM CPU 1 (212)) may release a lock on the FIM queue 210 and perform the transfer operation between a relevant die and a host interface. When the transfer operation is performed, the lock on the FIM queue 210 is released to allow the other FIM CPU (e.g., FIM CPU 2 (214)) to perform, in parallel, a transfer operation between a relevant die and the host interface. When performing a non-transfer operation, a FIM CPU will maintain the lock on the FIM queue 210 so that only one FIM CPU is working at a time. In an aspect, transfer operations normally take longer to execute (e.g., 50 or 60 microseconds) relative to non-transfer operations (e.g., 1 microseconds). As such, the transfer operations of different FIMs are allowed to run in parallel to boost the throughput of the SSD. In contrast, the non-transfer operations of different FIMs are performed in order (serial manner) as such operations are quick to complete, and therefore, do not need to be run in a parallel manner.

Figure 3:
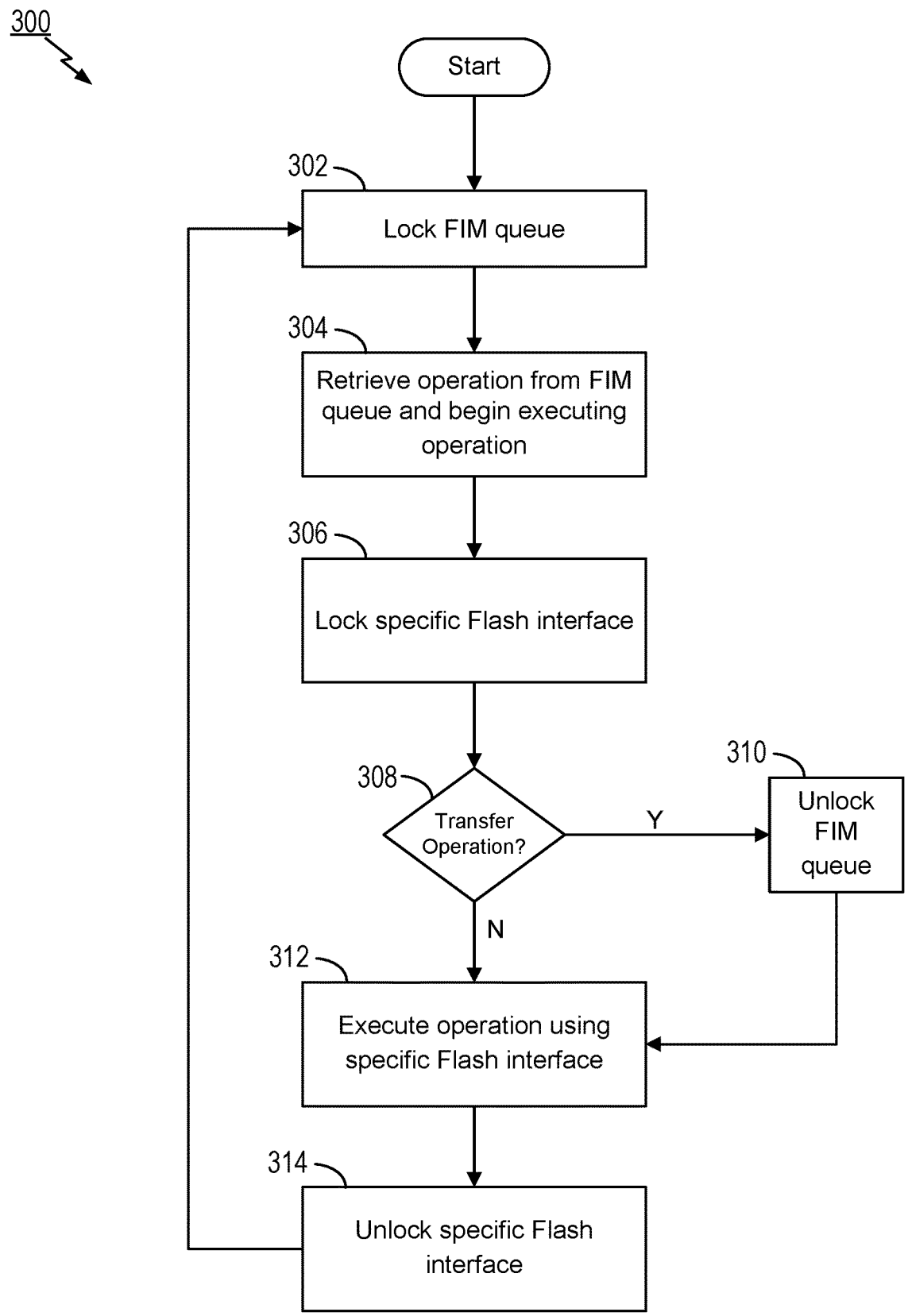
FIG. 3 illustrates a flow diagram of an exemplary method for distributed FIM processing in accordance with aspects of the present disclosure.

FIG. 3 illustrates a flow diagram of an exemplary method 300 for distributed flash interface module (FIM) processing in accordance with aspects of the present disclosure. The method may be performed by a first FIM CPU (e.g., FIM CPU 1 (212)). The method 300 includes locking a FIM queue (e.g., FIM queue 210) as shown at block 302. The first FIM CPU locks the FIM queue to have mutually exclusive usage of the FIM queue for processing an operation from the FIM queue. If at the same time a second FIM CPU (e.g., FIM CPU 2 (214)) is processing an operation from the FIM queue, the first FIM CPU is blocked from executing its operation until the second FIM CPU releases the FIM queue lock. When the first FIM CPU is able to successfully lock the FIM queue, the first FIM CPU will have the mutually exclusive usage of the FIM queue for processing its operation.

The method 300 further includes retrieving the operation from the FIM queue and beginning to execute the operation as shown at block 304. The operation may indicate to the first FIM CPU a specific flash interface (e.g., flash interface 1 (216)) to use for the operation. Accordingly, the method 300 also includes locking the specific flash interface as shown at block 306. The first FIM CPU locks the specific flash interface to have mutually exclusive usage of the specific flash interface. If at the same time the second FIM CPU is processing a transfer operation in the specific flash interface, the first FIM CPU is blocked from executing its operation until the transfer operation of the second FIM CPU is completed and the specific flash interface lock is released. When the first FIM CPU is able to successfully lock the specific flash interface, the first FIM CPU will have the mutually exclusive usage of the specific flash interface for processing its operation.

The method 300 also includes determining whether the current operation retrieved from the FIM queue is a transfer operation as shown at block 308. If the current operation processed by the first FIM CPU is a transfer operation, then the method 300 includes first releasing the lock on the FIM queue, as shown at block 310, to allow the second FIM CPU to process a transfer operation in parallel. If the current operation processed by the first FIM CPU is not a transfer operation, or after the FIM queue lock is released (block 310), the method 300 includes executing the operation using the specific flash interface as shown at block 312. The method 300 also includes releasing the lock on the specific flash interface after execution of the operation is completed as shown at block 314. Thereafter, the method 300 includes starting the process over, i.e., going back to block 302 after releasing the lock on the specific flash interface at block 314. At block 302, if the FIM queue is already locked by the first FIM CPU, then the first FIM CPU may immediately start processing a next operation in the FIM queue. This may occur when the first FIM CPU processes a non-transfer command/operation and a release of the lock on the FIM queue did not previously occur. In an aspect, the method 300 is relevant for all FIM CPUs of the SSD and ensures that only transfer operations amongst the FIM CPUs are executed in parallel over different flash interfaces.

In another aspect of the disclosure, a FIM module including a FIM queue, a FIM CPU, and a flash interface may optionally be used. In this architecture, n FIM modules are provided, where n is an integer greater than 1. Moreover, an upper FIM CPU (e.g., processor) is provided that feeds the FIM queues of the n FIM modules. The upper CPU receives operation commands for the FIMs in a single upper queue. Operations in the single upper queue are serialized by nature, similar to a FIM queue. The FIM queues as a whole are limited to a size 1. As such, the upper CPU feeds a next operation to a FIM queue only when the other FIM queues are empty. In this case, the upper CPU ensures that only one operation is being executed by all of the FIM queues. That is, one FIM queue executes one operation and the rest of the FIM queues are empty. When the operation in the FIM queue is a transfer operation, an associated lower FIM CPU pops/removes the transfer operation from the FIM queue prior to execution to allow the upper CPU to feed another operation to one of the FIM queues. All non-transfer operations are popped/removed from the FIM queue only after execution.

In accordance with the present disclosure, the novel architecture is not limited to transfer operations. The novel architecture can also be implemented to support other requirements that force serialized operations at the NAND level, e.g., power consumption synchronization. The novel architecture may be implemented to synchronize an order operation at the FIM level. Currently, synchronization is performed by the controller or some other hardware module, but may be performed at the FIM level according to the novel architecture. A mechanism may be provided in the architecture to prevent ordering deadlock. This may occur when a system includes two FIMs. For example, the mechanism may provide that no more than two transfer operations may be performed in one FIM relative to another FIM. The novel architecture may also be applied to data transfers outside of the controller order.

An advantage of the novel architecture is that it allows non-transfer operations of different FIMs to be executed in a serialized manner. This avoids deserialized operation that increases a complexity of a system when preserving an order of operations amongst different FIMs. Consequently, resources (e.g., RAM) are utilized more efficiently. This situation may accrue, for example, during read operations where read locations are not in order and depend on a translation table. At the same time, the novel architecture allows different FIMs to simultaneously perform transfer operations, which increases performance capacity (e.g., since transfer operations typically a longer time to execute relative to non-transfer operations). Accordingly, the novel architecture is advantageous when power management is limited to low power as a device need not activate a full power mode to support all requested operations.

Figure 4:
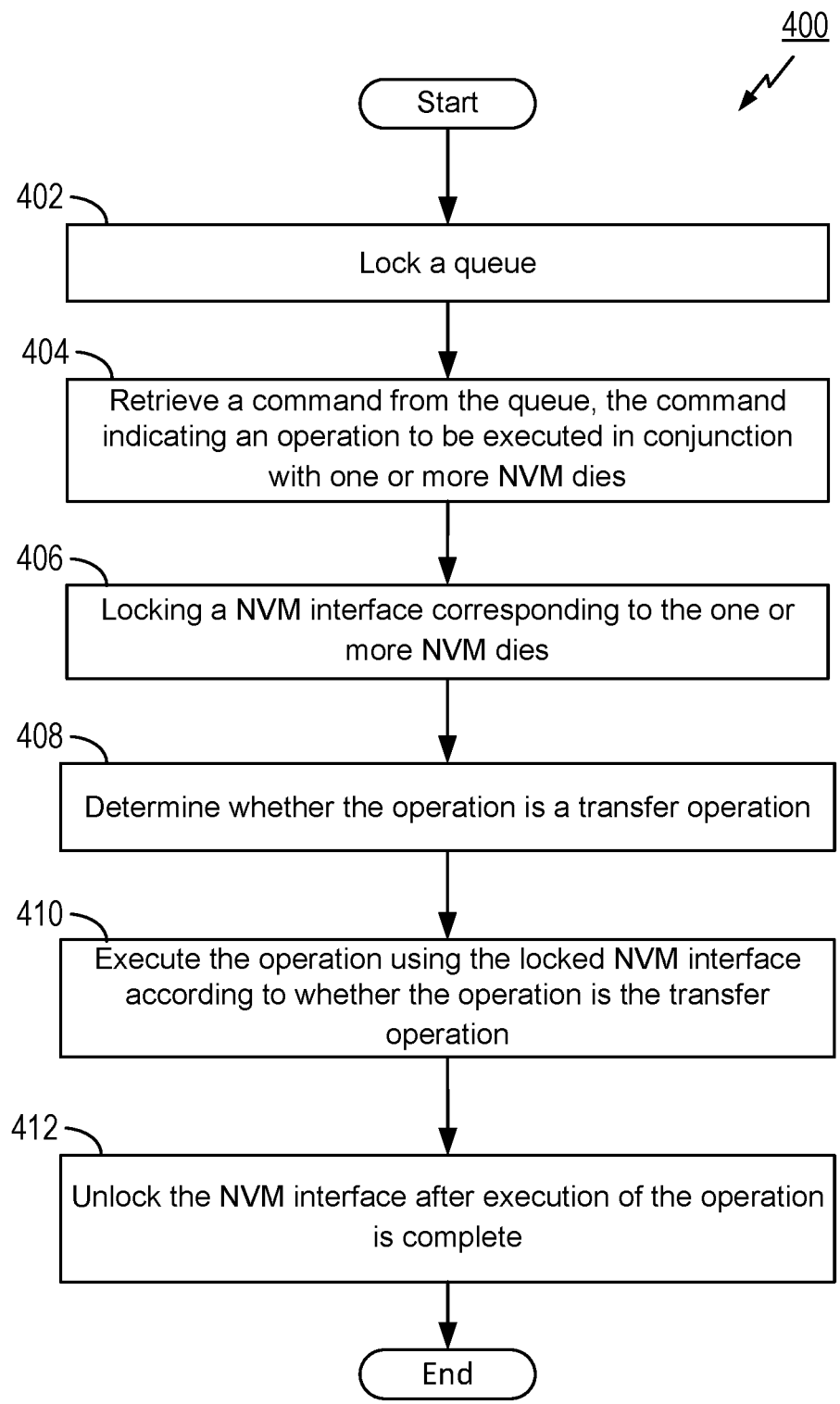
FIG. 4 illustrates a flow diagram of an exemplary method for performing an operation related to one or more non-volatile memory (NVM) dies of a SSD in accordance with aspects of the present disclosure.

FIG. 4 illustrates a flow diagram of an exemplary method 400 for performing an operation related to one or more non-volatile memory (NVM) dies of a solid state drive (SSD). The method 400 may be performed by a controller (e.g., FIM controller 116 or FIM CPU 1 (212)).

The method 400 includes locking a queue (e.g., FIM queue 112 or FIM queue 212) as shown at block 402. In an aspect, locking the queue facilitates exclusive usage of the queue to execute an operation (e.g., when the operation is not a transfer operation).

The method 400 further includes retrieving a command from the queue as shown at block 404. The command indicates an operation to be executed in conjunction with one or more NVM dies (e.g., memory dies 124 of NVM 120, die 1 (220), die 2 (222), die 3 (224), and/or die 4 (226)).

The method 400 also includes locking a NVM interface (e.g., flash interface 1 (216) or flash interface 2 (218)) corresponding to the one or more NVM dies as shown at block 406. In an aspect, the NVM interface is one of at least two NVM interfaces of the SSD via which the operation can be executed. In a further aspect, the NVM interface is locked to facilitate exclusive usage of the NVM interface to execute the operation. In yet a further aspect, an identity of the NVM interface to lock is indicated by the command.

The method 400 includes determining whether the operation is a transfer operation as shown at block 408. In an aspect, the transfer operation may be a transfer of data from the one or more NVM dies to a buffer external to the SSD (e.g., host buffer) and/or a transfer of data from the buffer external to the SSD to the one or more NVM dies. A non-transfer operation may be a die selection operation, a programming operation, a sense operation, a read die status operation, an erase operation, and/or or a latch move operation.

The method 400 further includes executing the operation using the locked NVM interface according to whether the operation is the transfer operation as shown at block 410. In an aspect, when the operation is determined to be the transfer operation, executing the operation includes unlocking the queue to allow execution of a second operation (e.g., second transfer operation) from the queue by a second controller (e.g., FIM controller 116 or FIM CPU 2 (214)), wherein the transfer operation is executed by the controller in a parallel manner with the second operation executed by the second controller. In another aspect, when the operation is determined to not be the transfer operation, executing the operation includes maintaining a lock on the queue to prevent execution of a second operation from the queue by a second controller while the operation is executed by the controller, wherein the operation is executed in a serial manner with the second operation.

The method 400 also includes unlocking the NVM interface after execution of the operation is complete as shown at block 412.

Figure 5:
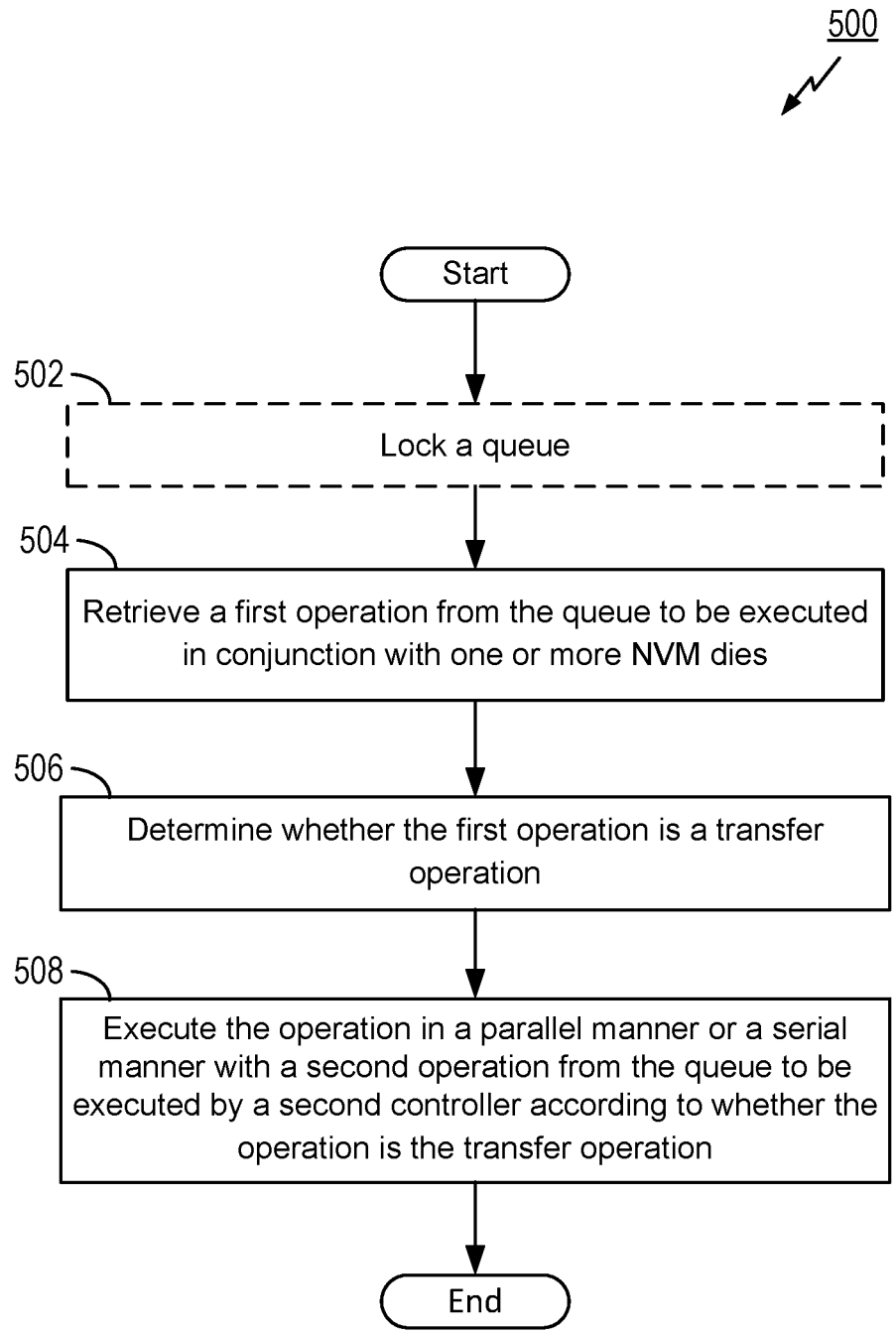
FIG. 5 illustrates a flow diagram of another exemplary method for performing an operation related to one or more NVM dies of a SSD in accordance with aspects of the present disclosure.

FIG. 5 illustrates a flow diagram of another exemplary method 500 for performing an operation related to one or more non-volatile memory (NVM) dies of a solid state drive (SSD). The method 500 may be performed by a controller (e.g., FIM controller 116 or FIM CPU 1 (212)).

The method 500 optionally includes locking a queue (e.g., FIM queue 112 or FIM queue 212) to retrieve a first operation as shown at block 502. In an aspect, the queue is locked to facilitate exclusive usage of the queue to execute the first operation (e.g., when the first operation is not a transfer operation).

The method 500 further includes retrieving the first operation from the queue to be executed in conjunction with one or more NVM dies (e.g., memory dies 124 of NVM 120, die 1 (220), die 2 (222), die 3 (224), and/or die 4 (226)) as shown at block 504.

The method 500 also includes determining whether the first operation is a transfer operation as shown at block 506. In an aspect, the transfer operation may be a transfer of data from the one or more NVM dies to a buffer external to the SSD (e.g., host buffer) and/or a transfer of data from the buffer external to the SSD to the one or more NVM dies. A non-transfer operation may be, for example, a die selection operation, a programming operation, a sense operation, a read die status operation, an erase operation, and/or or a latch move operation.

The method 500 further includes executing the first operation in either a parallel manner or a serial manner with a second operation from the queue to be executed by a second controller (e.g., FIM controller 116 or FIM CPU 2 (214)) according to whether the first operation is the transfer operation as shown at block 508. In an aspect, the first operation corresponds to a first set of dies of the one or more NVM dies and the second operation corresponds to a second set of dies of the one or more NVM dies, wherein the first set of dies and the second set of dies are mutually exclusive. In another aspect, the first operation may be executed in the parallel manner with the second operation when the second operation does not involve (e.g., require) accessing the one or more NVM dies (e.g., a read die status operation).

In an aspect, when the first operation is determined to be the transfer operation, executing the first operation includes unlocking the queue to allow execution of the second operation from the queue by the second controller, wherein the first operation is executed in the parallel manner with the second operation. In another aspect, when the first operation is determined to not be the transfer operation, executing the first operation includes maintaining a lock on the queue to prevent execution of the second operation from the queue by the second controller while the first operation is executed by the controller, wherein the first operation is executed in the serial manner with the second operation.

In an aspect, executing the first operation includes locking a NVM interface (e.g., flash interface 1 (216) or flash interface 2 (218)) corresponding to the one or more NVM dies, wherein the first operation is executed using the locked NVM interface, and unlocking the NVM interface after execution of the first operation is complete. In a further aspect, the NVM interface is locked to facilitate exclusive usage of the NVM interface to execute the first operation. In another aspect, the NVM interface is one of at least two NVM interfaces of the SSD via which the first operation can be executed and an identity of the NVM interface to lock is indicated by the first operation.

Figure 6:
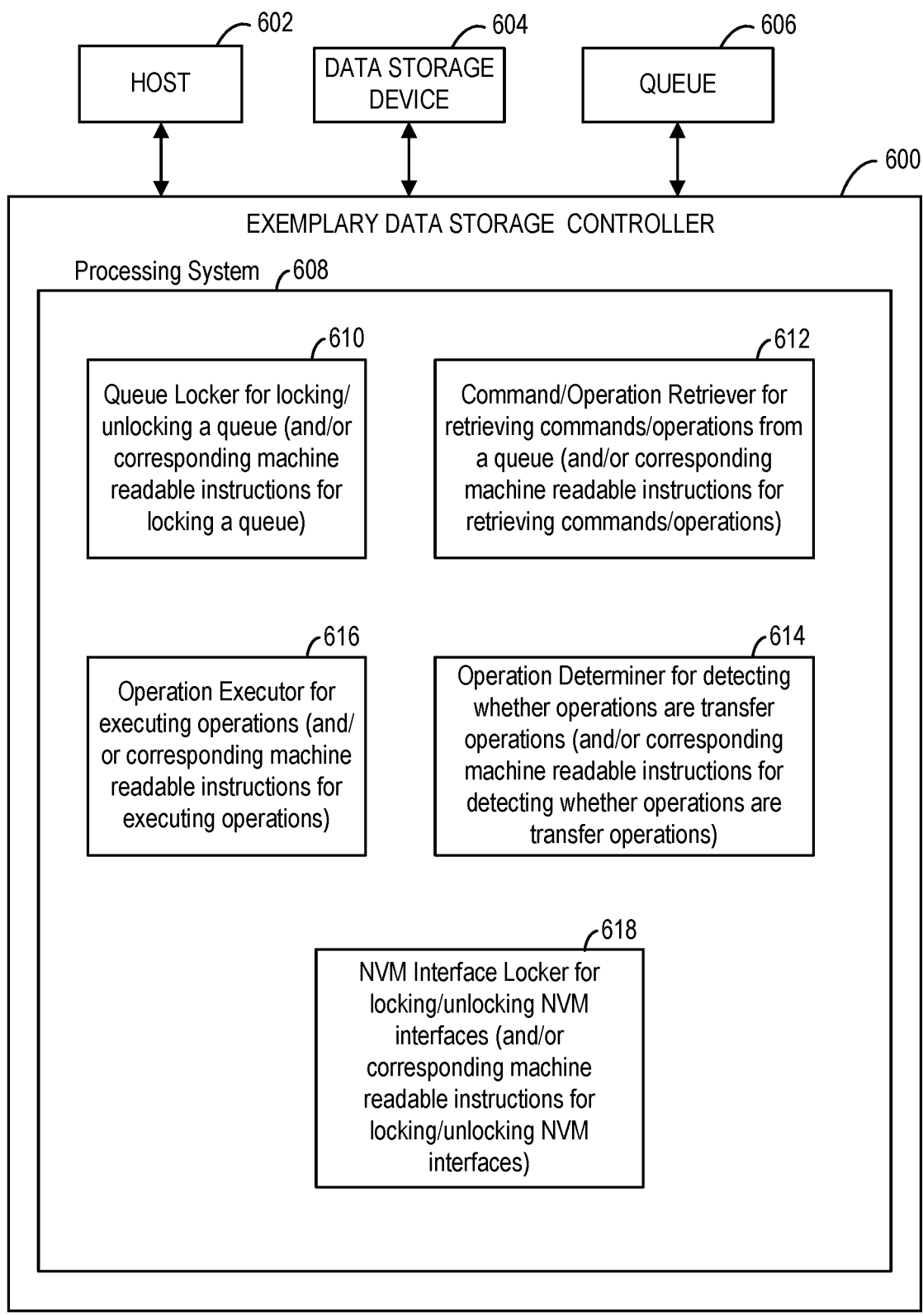
FIG. 6 is a block diagram summarizing selected features of an exemplary data storage controller equipped for performing an operation related to one or more NVM dies of a SSD in accordance with aspects of the present disclosure.

FIG. 6 is a block diagram summarizing selected features of an exemplary data storage controller 600 equipped for performing an operation related to one or more non-volatile memory (NVM) dies of a solid state drive (SSD) according to an embodiment of the subject matter described herein. The data storage controller 600 may be configured to communicate with a host device 602, a data storage device 604, and a queue 606. Although many examples described herein relate to NVM controllers or flash controllers for executing operations in conjunction with flash dies, the data storage device 604 may be any suitable memory or storage device and is not limited to NVM/flash devices, and the data storage controller 600 may be any suitable memory controller device and is not limited to NVM/flash-based controllers.

The exemplary data storage controller 600 of FIG. 6 includes a processor 608 (e.g., processing system/circuitry) for locking/unlocking the queue 606, retrieving commands/operations from the queue 606, determining whether the operations from the queue 606 are transfer operations, locking/unlocking an interface (e.g., NVM interface) corresponding to the data storage device 604, and executing operations between the data storage device 604 and the host device 602. The exemplary processor 608 includes a queue locker 610 configured to lock/unlock the queue 606. The processor 608 also includes a command/operation retriever 612 configured to retrieve commands/operations from the queue 606.

The processor 608 further includes a queue locker 610 configured to lock and unlock the queue 606. The processor 608 further includes a command/operation retriever 612 configured to retrieve commands/operations from the queue 606 to be executed in conjunction with the data storage device 604. The processor 608 also includes an operation determiner 614 configured to determine whether an operation from the queue 606 is a transfer operation. The processor 608 further includes an operation executor 616 configured to execute an operation in either a parallel manner or a serial manner with another operation from the queue 606 according to whether the operation is a transfer operation. The processor 608 also includes an interface locker 618 for locking and unlocking an interface (e.g., NVM interface) of the data storage device 604.

In at least some examples, means may be provided for performing the functions illustrated in FIGS. 4 and 5 and/or other functions illustrated (such as those illustrated in FIG. 3) or described herein. For example, an apparatus (e.g.

processing system 608) may be provided for use with a data storage device (e.g., storage device 604) and a queue (e.g., queue 606) where the apparatus includes: means (such as the queue locker 610) for locking and unlocking a queue; means (such as the command/operation retriever 612) for retrieving a command/operation from a queue; means (such as the operation determiner 614) for determining whether an operation is a transfer operation; means (such as the operation executor 616) for executing an operation from a queue in either a parallel manner or a serial manner with another operation from the queue according to whether the operation is a transfer operation; and means (such as the interface locker 618) for locking an unlocking an NVM interface. In one aspect, means for performing some of these functions may also be found in FIGS. 1 and/or 2.

According to another aspect, a non-volatile memory (NVM) device including an apparatus for performing an operation related to one or more non-volatile memory (NVM) dies of a solid state drive (SSD) is disclosed. The apparatus may include means for locking a queue. This means for locking the queue may be implemented by structure such as FIM controller 116, or FIM controller 116 in combination with one or more of memory 110, NVM controller 108, FIM queue 112, NVM interface 118, NVM 120, and host 102, and equivalents thereof such as logic circuitry or a dedicated processor.

The apparatus may further include means for retrieving a command/operation from the queue, the command/operation indicating an operation to be executed in conjunction with one or more NVM dies. This means for retrieving the operation/operation may be implemented by structure such as FIM controller 116, or FIM controller 116 in combination with one or more of memory 110, NVM controller 108, FIM queue 112, and host 102, and equivalents thereof such as logic circuitry or a dedicated processor.

The apparatus may also include means for locking a NVM interface corresponding to the one or more NVM dies. This means for locking the NVM interface may be implemented by structure such as FIM controller 116, or FIM controller 116 in combination with one or more of NVM controller 108, FIM queue 112, and NVM interface 118, and equivalents thereof such as logic circuitry or a dedicated processor.

The apparatus may further include means for determining whether the operation is a transfer operation. This means for determining may be implemented by structure such as FIM controller 116, or FIM controller 116 in combination with one or more of NVM controller 108, FIM queue 112, NVM interface 118, and NVM 120, and equivalents thereof such as logic circuitry or a dedicated processor.

The apparatus may also include means for executing the operation using the locked NVM interface according to whether the operation is the transfer operation. This means for executing the operation may be implemented by structure such as FIM controller 116, or FIM controller 116 in combination with one or more of NVM controller 108, FIM queue 112, NVM interface 118, and NVM 120, and equivalents thereof such as logic circuitry or a dedicated processor.

The apparatus may further include means for unlocking the NVM interface after execution of the operation is complete. This means for unlocking the NVM interface may be implemented by structure such as FIM controller 116, or FIM controller 116 in combination with one or more of NVM controller 108, FIM queue 112, and NVM interface 118, and equivalents thereof such as logic circuitry or a dedicated processor.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A method of performing an operation at a controller, the operation related to one or more non-volatile memory (NVM) dies of a solid state drive (SSD), the method comprising:
    locking a queue to retrieve a first operation;
    retrieving the first operation from the queue to be executed in conjunction with one or more NVM dies;
    determining whether the first operation is a transfer operation; and
    executing the first operation in either a parallel manner or a serial manner with a second operation from the queue to be executed by a second controller according to whether the first operation is the transfer operation, wherein the executing the first operation includes:
        locking a NVM interface corresponding to the one or more NVM dies, wherein the first operation is executed using the locked NVM interface, and
        unlocking the NVM interface after execution of the first operation is complete.

2. The method of claim 1,
    wherein when the first operation is determined to be the transfer operation, the executing the first operation includes unlocking the queue to allow execution of the second operation from the queue by the second controller, wherein the first operation is executed in the parallel manner with the second operation.

3. The method of claim 1,
    wherein when the first operation is determined to not be the transfer operation, the executing the first operation includes maintaining a lock on the queue to prevent execution of the second operation from the queue by the second controller while the first operation is executed by the controller, wherein the first operation is executed in the serial manner with the second operation.

4. The method of claim 1,
    wherein the queue is locked to facilitate exclusive usage of the queue to execute the first operation when the first operation is determined to not be the transfer operation, and wherein the NVM interface is locked to facilitate exclusive usage of the NVM interface to execute the first operation.

5. The method of claim 1,
wherein the NVM interface is one of at least two NVM interfaces of the SSD via which the first operation can be executed, and
wherein an identity of the NVM interface to lock is indicated by the first operation.

6. The method of claim 1, wherein when the first operation is determined to not be the transfer operation, the first operation is at least one of:
a die selection operation;
a programming operation;
a sense operation;
a read die status operation;
an erase operation; or
a latch move operation.

7. The method of claim 1, wherein the first operation is executed in the parallel manner with the second operation when the second operation does not involve accessing the one or more NVM dies.

8. A solid state drive (SSD), comprising:
one or more non-volatile memory (NVM) dies;
a queue;
a NVM interface corresponding to the one or more NVM dies; and
a controller communicatively coupled to a host device, the one or more NVM dies, the queue, and the NVM interface, wherein the controller is configured to:
lock the queue to retrieve a first operation,
retrieve the first operation from the queue to be executed in conjunction with the one or more NVM dies,
determine whether the first operation is a transfer operation,
execute the first operation in either a parallel manner or a serial manner with a second operation from the queue to be executed by a second controller according to whether the first operation is the transfer operation,
lock the NVM interface corresponding to the one or more NVM dies, wherein the first operation is executed using the locked NVM interface, and
unlock the NVM interface after execution of the first operation is complete.

9. The solid state drive of claim 8, wherein the first operation corresponds to a first set of dies of the one or more NVM dies and the second operation corresponds to a second set of dies of the one or more NVM dies, and wherein the first set of dies and the second set of dies are mutually exclusive.

10. The solid state drive of claim 8, wherein when the first operation is determined to be the transfer operation, the controller configured to execute the first operation is further configured to:
unlock the queue to allow execution of the second operation from the queue by the second controller; and
execute the first operation in the parallel manner with the second operation.

11. The solid state drive of claim 8, wherein when the first operation is determined to not be the transfer operation, the controller configured to execute the operation is further configured to:

maintain a lock on the queue to prevent execution of the second operation from the queue by the second controller while the first operation is executed by the controller; and
execute the first operation in the serial manner with the second operation.

12. The solid state drive of claim 8, wherein:
the controller is configured to lock the queue to facilitate exclusive usage of the queue to execute the first operation when the first operation is determined to not be the transfer operation, and
the controller is configured to lock the NVM interface to facilitate exclusive usage of the NVM interface to execute the first operation.

13. The solid state drive of claim 8,
wherein the NVM interface is one of at least two NVM interfaces of the SSD via which the first operation can be executed, and
wherein an identity of the NVM interface to lock is indicated by the first operation.

14. The solid state drive of claim 8, wherein when the first operation is determined to not be the transfer operation, the first operation is at least one of:
a die selection operation;
a programming operation;
a sense operation;
a read die status operation;
an erase operation; or
a latch move operation.

15. An apparatus for performing an operation at a controller of the apparatus, the operation related to one or more non-volatile memory (NVM) dies of the apparatus, the apparatus comprising:
means for locking a queue to retrieve a first operation;
means for retrieving the first operation from the queue to be executed in conjunction with one or more NVM dies;
means for determining whether the first operation is a transfer operation; and
means for executing the first operation in either a parallel manner or a serial manner with a second operation from the queue to be executed by a second controller according to whether the first operation is the transfer operation, wherein the means for executing the first operation is configured to:
lock a NVM interface corresponding to the one or more NVM dies, wherein the first operation is executed using the locked NVM interface, and
unlock the NVM interface after execution of the first operation is complete.

16. The apparatus of claim 15, wherein when the first operation is determined to be the transfer operation, the means for executing the first operation is configured to:
unlock the queue to allow execution of the second operation from the queue by the second controller; and
execute the first operation in the parallel manner with the second operation.

17. The apparatus of claim 15, wherein when the first operation is determined to not be the transfer operation, the means for executing the first operation is configured to:
maintain a lock on the queue to prevent execution of the second operation from the queue by the second controller while the first operation is executed by the controller; and
execute the first operation in the serial manner with the second operation.

18. The apparatus of claim 15, wherein the transfer operation includes at least one of:
- a transfer of data from the one or more NVM dies to a buffer external to the apparatus; or
- a transfer of data from the buffer external to the apparatus to the one or more NVM dies.

19. A method of performing an operation at a controller of a solid state drive (SSD), the operation related to one or more non-volatile memory (NVM) dies of the SSD, the method comprising:
- locking a queue;
- retrieving a command from the queue, the command indicating an operation to be executed in conjunction with one or more NVM dies;
- locking a NVM interface corresponding to the one or more NVM dies;
- determining whether the operation is a transfer operation;
- executing the operation using the locked NVM interface according to whether the operation is the transfer operation; and
- unlocking the NVM interface after execution of the operation is complete.

20. The method of claim 19, wherein when the operation is determined to be the transfer operation, the executing the operation includes unlocking the queue to allow execution of a second operation from the queue by a second controller, wherein the operation is executed in a parallel manner with the second operation.

21. The method of claim 19, wherein when the operation is determined to not be the transfer operation, the executing the operation includes maintaining a lock on the queue to prevent execution of a second operation from the queue by a second controller while the operation is executed by the controller, wherein the operation is executed in a serial manner with the second operation.

22. The method of claim 19,
- wherein the queue is locked to facilitate exclusive usage of the queue to execute the operation when the operation is detected to not be the transfer operation, and
- wherein the NVM interface is locked to facilitate exclusive usage of the NVM interface to execute the operation.

23. The method of claim 19,
- wherein the NVM interface is one of at least two NVM interfaces of the SSD via which the operation can be executed, and
- wherein an identity of the NVM interface to lock is indicated by the operation.

* * * * *